United States Patent [19]

Owen et al.

[11] Patent Number: 4,492,519

[45] Date of Patent: Jan. 8, 1985

[54] TURBOCHARGER EXHAUST GAS BY-PASS VALVE

[75] Inventors: Bruce R. Owen, Indianapolis; R. Charles Sarle, Noblesville, both of Ind.

[73] Assignee: Wallace Murray Corporation, New York, N.Y.

[21] Appl. No.: 12,364

[22] Filed: Feb. 15, 1979

[51] Int. Cl.³ .............. F01D 17/00; F02B 37/00; F16K 3/04
[52] U.S. Cl. .............................. 415/145; 60/602; 251/300
[58] Field of Search .............. 60/600, 601, 602, 603; 251/300, 301; 415/144, 145, 148, 151

[56] References Cited

U.S. PATENT DOCUMENTS

| 895,697 | 8/1908 | Snow | 251/300 X |
| 950,204 | 2/1910 | Drown | 251/301 |
| 2,731,792 | 1/1956 | Nallinger | 60/602 X |
| 3,047,006 | 7/1962 | Transeau | 251/301 X |
| 4,075,849 | 2/1978 | Richardson | 60/602 |
| 4,120,156 | 10/1978 | McInerney | 60/602 |
| 4,202,176 | 5/1980 | Mezger | 60/600 |

FOREIGN PATENT DOCUMENTS 850578 9/1952 Fed. Rep. of Germany ...... 251/300
855530 11/1952 Fed. Rep. of Germany ...... 415/151

OTHER PUBLICATIONS

"Turbocharging Engines for Racing and Passenger Cars", Mezyer, SAE Paper, No. 780 718, Aug. 7, 1978.

Primary Examiner—Michael Koczo
Attorney, Agent, or Firm—Thomas J. Greer, Jr.

[57] ABSTRACT

A turbocharger having a by-pass system for selectively by-passing exhaust gases from the turbine rotor. The by-pass arrangement includes a housing portion having a by-pass passage which preferably extends from the exhaust inlet to the exhaust outlet. There is a port from the exhaust inlet into the by-pass passage which is selectively controlled by a pivoted valve. The turbocharger with the by-pass arrangement may be utilized with a conventional vehicle exhaust system of the type having a catalytic convertor and if so desired, a major portion of the by-pass gases may also by-pass the catalytic convertor. A control device disposed remote from the turbocharger permits the use of relatively inexpensive control elements.

6 Claims, 6 Drawing Figures

FIG. 4
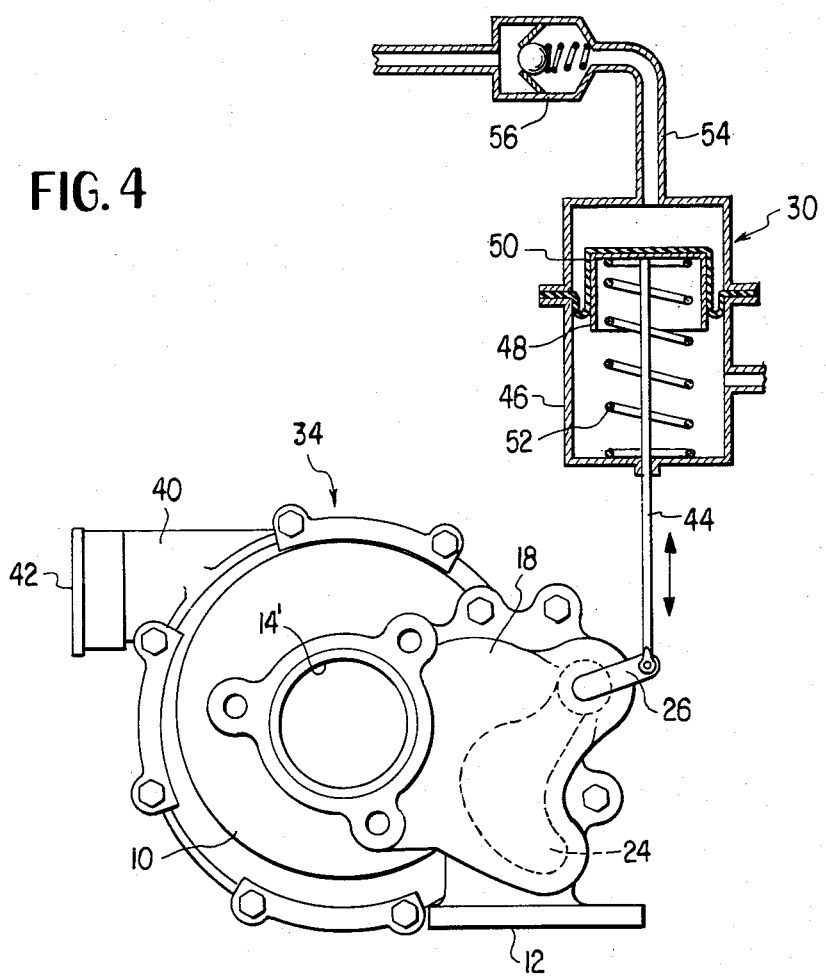
FIG. 5
FIG. 6
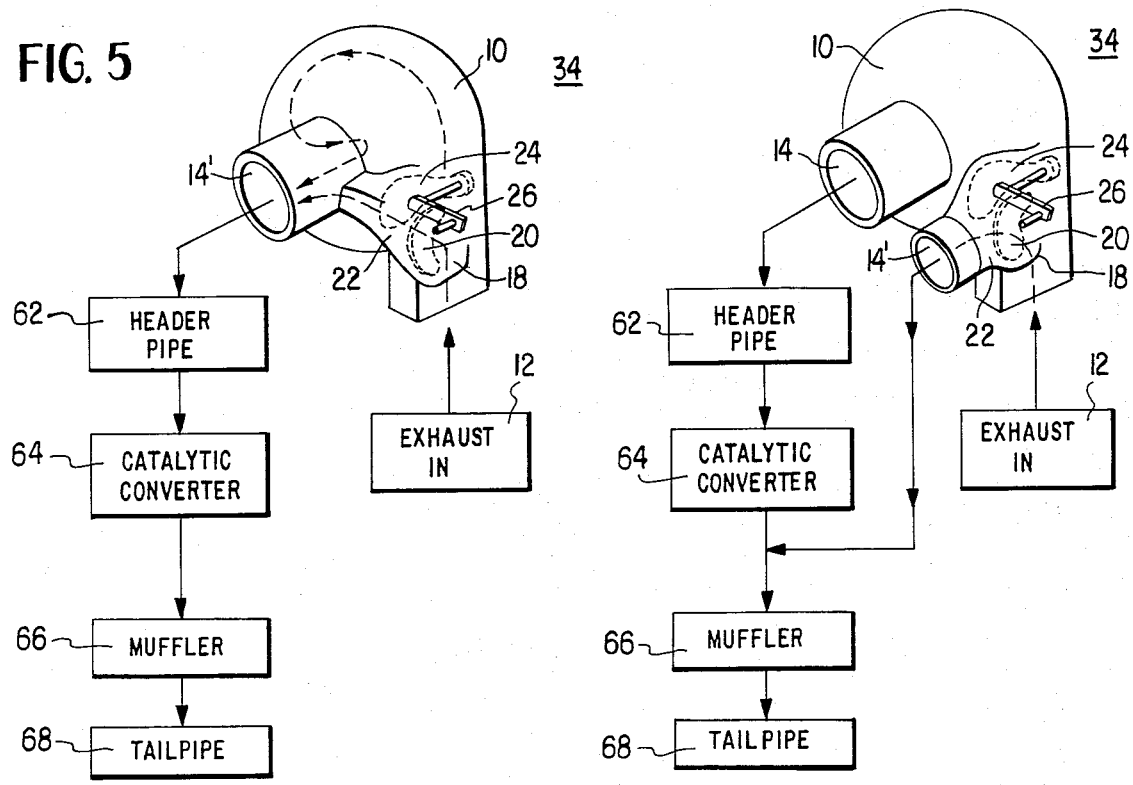

TURBOCHARGER EXHAUST GAS BY-PASS VALVE

This invention relates to turbochargers of the type having an exhaust by-pass system. Turbochargers are well known in the internal combustion engine art and have in recent years replaced the well known centrifugal supercharger. The latter derives its energy by gear or belt coupling to the crankshaft of the engine, while the former derives its energy from engine exhaust gases, such gases being later passed to the atmosphere. A turbine is placed in the passage of the exhaust gases, being located between the engine and the exit point of such gases to atmosphere. The impeller wheel of the turbine is turned by the exhaust gases and the turbine is coupled to a compressor. The compressor performs work on ambient air, increasing its pressure, to thereby increase the mass flow of air fed into the engine for combustion. This pressure increase is known as boost.

While most engines with turbochargers do not require a control for the boost due to proper matching of the units for a limited range of engine speed, there are instances in which boost level control is necessary. When boost is desired at low engine speeds, the turbine housing is designed smaller so as to run the wheels faster with less exhaust flow. As the engine speed goes up, the turbocharger unit runs faster to the point of overboost conditions. Existing units have a turbine by-pass consisting of a port in the turbine housing generally at or about the exhaust gas inlet. This port opens into a by-pass passage going to the exhaust gas outlet of the housing. The port is sealed by either a poppet valve or a flapper valve. Exhaust pressure on the face of these valves may work against a spring to actuate the valve. This, however, is a crude arrangement to control boost levels due to pulsating flow which would cause high wear and early failures of the valves, valve seats and spring loaded control devices.

It is known to augment the actuation of the valves by sensing boost pressure in the intake manifold and using a spring loaded diaphragm to control actuation of the valves. In those conditions where maximum boost level for safe engine operation is reached, the valves open to allow exhaust gas to by-pass the turbine section, thus returning the turbocharger speed to the level which provides for the designed boost. These valve arrangements operate in the highly corrosive exhaust flow and are subject to extremely high temperatures. The valves are expensive due to the materials required for this atmosphere. Because the valves move linearly perpendicular to the port, the materials are also subjected to high shock loads. The port is sealed at the closed position with very limited travel to flow open. This limited travel with its resultant close proximity of the valve face to the port also limits the flow of gas from the port. In order to increase the flow, the valves need to become larger with the resultant increased cost and size being a design factor for flow levels.

In accordance with this invention, it is proposed to provide a turbine by-pass valve arrangement which will allow full-flow of exhaust gases away from the turbine section of the turbocharger and still improve known levels of cost, reliability and control sensitivity. This is accomplished by using a valve plate which by a sliding action covers and uncovers a port that is essentially the same area as the exhaust gas inlet to the turbine housing. The by-pass passage maintains this area into the exhaust gas outlet so that back pressure on the engine will not significantly increase when the by-pass is open. Unnecessary back pressure due to the restriction of the turbine housing will be present if a substantial part of the exhaust gas is still going through the turbine housing when the turbocharger is in the by-pass mode and the engine is in that range in which the supercharged intake cycle is not required.

The valve plate is attached to a valve stem which runs in a close clearance bore out of the by-pass housing and is terminated outside the turbocharger with a lever arm and pin. The diaphragm control sensing boost in the intake manifold is remotely mounted with the inherent advantages of removal from the highly corrosive and hot atmosphere. The control motion is straight linear and its shaft is linked to the lever arm so as to impart a rotary motion to the valve plate.

The diaphragm works against a spring also remotely mounted. The spring is loaded only for the required boost pressure and what little friction exists in the swinging of the valve plate. This is opposed to the poppet and flapper valve types in which the spring must also be loaded to hold the valve tightly against the seat to prevent flutter from the pulsating exhaust gases.

The by-pass valve has a close clearance seal at the port. This clearance allows the valve plate to freely swing when actuated. The sliding motion has a shearing action on any exhaust deposits and when the valve is opened, the high mass flow purges the port area of this debris dislodged by the sliding motion. The valve is thus self-cleaning and the largest operating clearance would be at assembly before running due to a deposit buildup and the shear action allowing the valve to create its own running valve seat in operation. The valve port is sized to have the substantial amount of gas flow running in the by-pass mode when in full open position, thus giving an infinite position of the valve plate to the port. As varying engine conditions signal the control, the plate position will by-pass just that amount of gas to properly match boost level requirements. The clearance at assembly is established by the thickness of the plate and the distance in the by-pass housing from the port face to the stem side shoulder of the housing.

The stem is perpendicular to the valve plate and is positioned in a close clearance bore in the by-pass housing to minimize leakage. It is to be understood that the stem can be reversed so as to run in a close clearance bore in the turbine housing. Stem location is largely dictated by where the control is most advantageously mounted in a particular application. The general valve and port shape were selected to minimize the control motion required to open and close the large port required for full flow by-passing.

The nature of the spring diaphragm control arrangement with regard to safety is that two different failure modes can occur. A diaphragm failure would be rather sudden where the spring failure would probably occur over a period of time. With the diaphragm failure, the spring would close the valve and overboost could occur. However, there would not be the sudden loss of power which would have serious implications in traffic situations. The spring failure results in a gradual loss of power over day-by-day driving signaling its weakened condition.

The turbocharger equipped with the waste gate of this invention may be utilized in conjunction with an engine exhaust system having a catalytic converter. If desired, the waste gate arrangement may be such that all by-pass gases will pass out through the usual exhaust outlet and through the catalytic converter. On the other hand, if desired, the by-pass may open out through the turbine housing adjacent and separate from the exhaust outlet so that in the open position of the waste gate, the bypassed exhaust gases may by-pass the catalytic converter. This by-passing of the catalytic converter while a limited amount of the gases still pass through the turbine housing and out the exhaust outlet for passage through the catalytic converter allows maintenance of the heat to allow the catalyst to function faster when required.

IN THE DRAWINGS

FIG. 4 is a schematic view showing the turbocharger with by-pass system having coupled thereto a representative control circuit.

FIG. 5 is a schematic view showing the exhaust flow from an engine through a turbocharger turbine section and by-pass system from which all flow goes out of the turbine exhaust outlet into a vehicle exhaust system.

FIG. 6 is a schematic view similar to FIG. 5 except that by-pass gas is routed downstream of a vehicle catalytic converter rather than flowing through the turbine section exhaust outlet.

Figure 1:
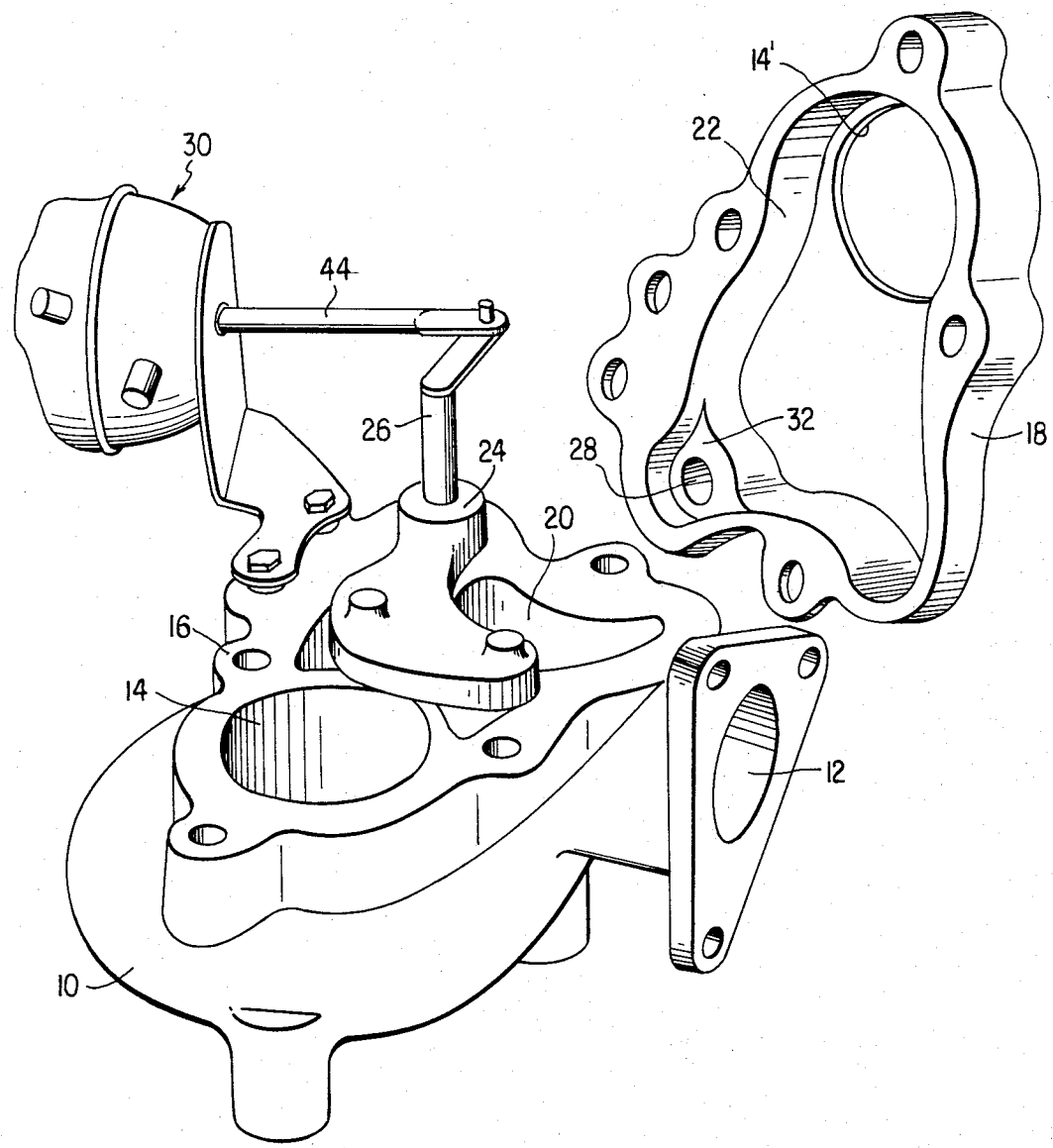
FIG. 1 is a perspective view of a turbine housing portion of a turbocharger incorporating the exhaust by-pass system with the by-pass housing being displaced from the remainder of the assembly.

Referring now to FIG. 1 of the drawings, the numeral 10 denotes a turbine housing of a turbocharger with an exhaust gas inlet 12 and an exhaust gas outlet 14. A flange face 16 has been added to a conventional type turbine housing to accept mounting of an exhaust gas by-pass housing 18, which has an interior defining a by-pass passage 22. A by-pass port 20 linking the exhaust gas inlet passage 12 and the by-pass passage 22 is contained in the flange face 16. The by-pass housing 18 has an exhaust gas outlet 14' which is in alignment with and forms a continuation of the outlet 14 of the turbine housing 10.

A valve plate 24 is utilized for opening and closing the by-pass port 20. This valve plate 24 swings parallel to flange face 16 around a pivot point established by an attached valve stem 26 which runs in a close clearance bore 28 in by-pass housing 18. The valve stem 26 incorporates a lever arm for an attachment externally of the system to a suitable linear actuating control 30. This lever arm section of the valve stem 26 provides for conversion of the linear control movement to the pivoted rotary motion of the valve plate 24. The by-pass port 20 and by-pass passage 22 have been sized to be of a cross-sectional area at least equal to the area of the exhaust gas inlet 12. Thus in the full open position of valve plate 24 there is a capacity for full gas flow by-passing with a slight residual flow through the turbine housing 10. It will be readily apparent that the gas flow rate in the by-pass system from full closed to full open is infinitely variable thus enhancing the control sensitivity with by-passing just that amount of exhaust gas to limit the speed of the turbocharger to that level demanded by the engine requirements. The by-pass valve port 20 and valve plate 24 have the general quarter moon shape shown to minimize the rotary motion required to uncover for full flow by-passing. It is to be understood that the by-pass port 20 and valve plate 24 can be of other shapes as required for particular applications.

Figure 2:
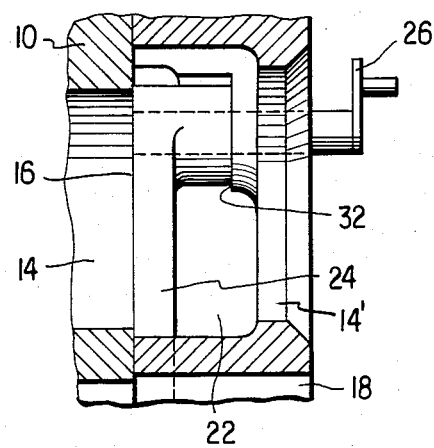
FIG. 2 is a fragmentary sectional view through the by-pass housing in a portion of the turbine housing and shows the mounting of the valve.

Referring now to FIG. 2, the by-pass housing 18 is now assembled on turbine housing 10 making a seal at flange face 16. The sectional view is a cut on the centerline of exhaust gas outlets 14 and 14' looking into the interior of by-pass housing 18 toward the valve plate 24. The valve to port seal is a close clearance type and is just enough to allow the valve plate 24 to swing freely across flange face 16. The clearance is established by the thickest portion of the valve plate 24 and distance between flange face 16 and a stem boss shoulder face 32 in the by-pass housing 18. The valve plate 24, when moving parallel to flange face 16 and perpendicular to by-pass port 20, has a shearing action on any exhaust deposits and when the by-pass port 20 is open, the high mass flow purges the area of sheared debris.

The valve system is self-cleaning and the largest operating clearance is at assembly before running due to the deposit build-up and shear action allowing the valve plate 24 to create its own running valve seat in operation. It can also be readily seen in this view that the by-pass passage 22 forms a passage port between exhaust outlet 14 in the turbine housing 10 and the exhaust outlet 14' in the by-pass housing 18 when the components are assembled.

Figure 3:
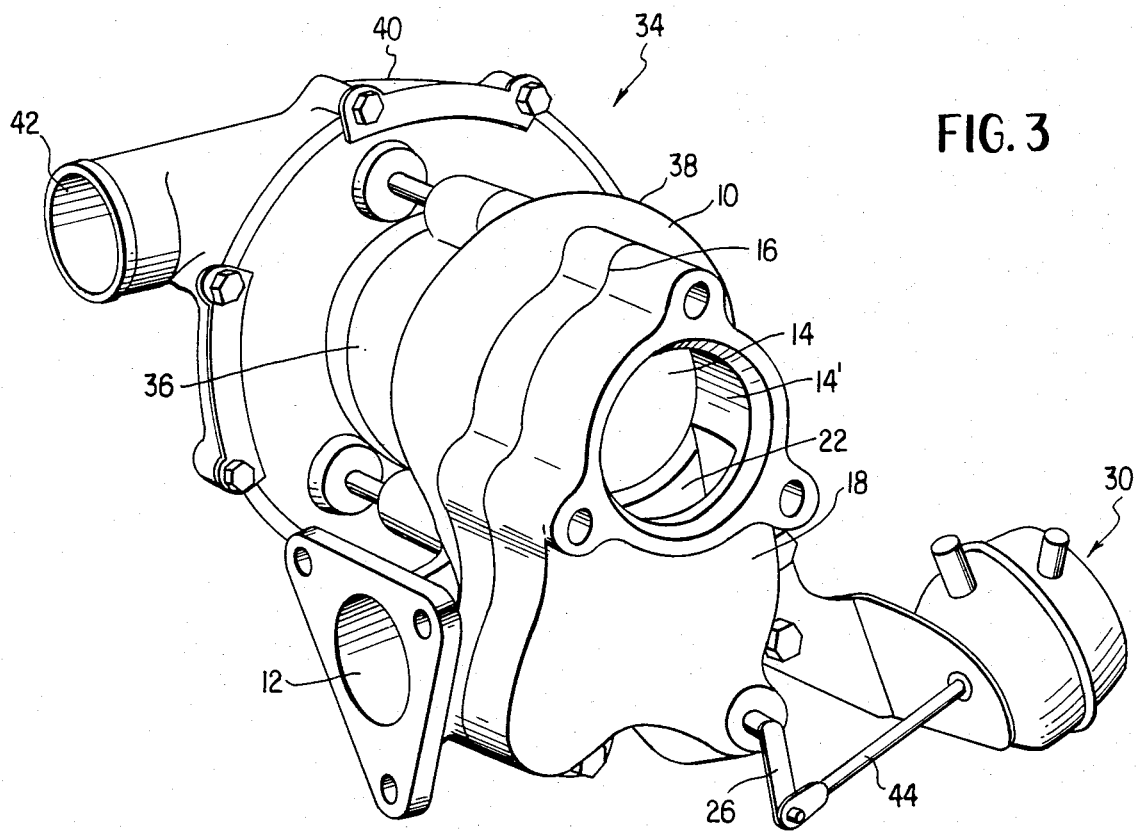
FIG. 3 is a perspective view of a turbocharger including the turbine housing and by-pass housing of FIG. 1 in the position of normal use.

In FIG. 3 there is shown a complete turbocharger 34 with a bearing section 36 between a turbine section 38 and a compressor section 40. It is to be understood that the turbine section 38 includes the by-pass system components, the turbine housing 10 and a turbine wheel (not shown). The compressor section includes a compressor cover and compressor wheel (not shown). The wheels are carried in the normal manner on a common shaft journalled in the bearing section 36. In operation exhaust gases from an engine flow into the turbine housing 10 at the exhaust inlet 12 and flow radially inwardly into the turbine wheel providing propulsion to the compressor wheel on the common shaft. The compressor wheel pulls in ambient air that flows radially outwardly through the compressor cover to provide pressurized air for the engine, discharging at the compressor outlet 42. The control 30 senses this pressure level of this air in the engine intake system.

The control 30 is depicted remotely mounted on a bracket which in turn is connected to the by-pass housing 18. However, the control 30 may be connected to any component of the turbocharger exterior or remote from the turbocharger completely. The main advantage of the invention with respect to the control is that any spring loaded device in the control is loaded only for the boost pressure and what little friction exists in the swing of the valve plate. In contrast, the alternative poppet or flapper type valve must have additional loading of the spring sufficient to hold the valve tightly against the seat to prevent fluttering and resultant leakage from the pulsating gases.

Although the valve stem 26 has been illustrated as being journalled within the by-pass housing 18, it is to be understood that it may extend from the opposite face of the valve plate 24 and be journalled in a suitable orifice in the turbine housing 10.

In FIG. 4 the turbocharger 34 is shown with a representative control 30 which is linked to the valve plate 24 through the valve stem 26. The valve plate 24 is shown in the position of closed or by-pass system off. A control rod 44 linked to the valve stem 26 passes through a control housing 46. Inside the housing 46 the control rod is attached to a spring retainer cup 48 and a rolling diaphragm 50. A spring 52 holds the valve plate 24 closed until previously established boost levels in the engine intake manifold react against the diaphragm 50, compressing spring 52 and pivoting the valve plate 24 to start by-passing of the exhaust gas. This reduces the speed of the turbocharger 34 reducing the discharge of pressurized air from the compressor outlet 42 connected to an engine intake manifold. With proper boost level resumed, the spring 52 returns the valve plate 24 and diaphragm 50 to their initial positions. Boost level is sensed through a line 54 connected to the engine intake system containing a check valve 56 which opens at a fraction of boost level maximum to allow the control 30 access to boost level sensing.

It will be apparent from FIG. 4 that should diaphragm 50 fail, the spring 52 will cause the valve plate 24 to remain in closed position. This will result in an overboost which is more desirable than a sudden loss of power which could have serious implications in traffic situations. On the other hand, the spring 52 is much less subject to sudden failure, but may weaken over a period of time with the resultant loss of boost signaling its weakened condition. It will also be readily apparent that the combination of variable valve opening positions and selection of spring rates provide for a much closer control over varying engine conditions than the basic on-off poppet or flapper type valve. While the control 30 is a basic type pneumatic setup, the invention can be controlled by electrical or hydraulic systems as long as they are coupled to a form of boost sensing in the engine.

It will be apparent from the foregoing description of the turbocharger by-pass arrangement that the invention may be formed of less expensive materials and will more easily operate than previous poppet valves and the like. First of all, since the valve plate 24 is pivotally mounted, it is not subjected to shock loads and may be constructed of less expensive materials than a poppet valve and its seat. The swinging action of valve plate 24 along with infinitely variable positioning also allows for a smoother operation than the rapid on-off of the poppet valve type. The valve plate 24, in its full open position, moves out of the path of exhaust flow coming from by-pass port 20 resulting in efficient, unrestricted flow. The control 30, being external of the corrosive atmosphere in the exhaust system and not subjected to heavy spring loadings, can also be of relatively inexpensive materials.

Although the by-pass port 20 and the by-pass passage 22 have been sized to be of a cross-sectional area at least equal to the area of exhaust gas inlet 12, it is to be understood that under certain operating conditions, it may be desirable that they be of a cross-sectional area which is smaller than that of the exhaust gas inlet 12. However, the differential in cross-sectional areas should not be such so as to cause an excessive power robbing back pressure buildup within the engine.

In FIG. 5, the exhaust inlet 12 of the turbine housing 10 of the turbocharger 34 receives gases from an engine which flow either through the turbine housing 10 for propulsion of turbocharger 34 or through the by-pass passage 22 in by-pass housing 18. All exhaust gas flow in either condition exits at exhaust gas outlet 14' into the usual vehicle exhaust system which may include a header pipe 62, catalytic converter 64, muffler 66 and tailpipe 68. The valve plate 24 is depicted with the by-pass port 20 in open position. This is the basic by-pass circuit in a vehicle as in the foregoing descriptions of the invention.

Referring now to FIG. 6, a variation of the vehicle installation of FIG. 5 is shown. This installation is the same as FIG. 5 except by-pass housing 18 has by-pass passage 22 and exhaust gas outlet 14' not connected to exhaust gas outlet 14 of turbine housing 10. Exhaust gas entering exhaust inlet 12 flows through turbine housing 10 and out exhaust gas outlet 14 and then through header pipe 62, catalytic converter 64, muffler 66 and tailpipe 68 when by-pass port 20 is closed. When valve plate 24 is actuated to open by-pass port 20 as depicted, the gas flow is through by-pass passage 22 and exhaust gas outlet 14' allowing by-passed gas to be routed to the vehicle exhaust system downstream of the catalytic converter 64. The gas then proceeds through muffler 66 and tailpipe 68.

Since the turbocharger 34 may be in operation during the emissions testing cycle, its exhaust flow must pass through the catalytic converter 64. However, when the by-pass system is actuated, the engine operating cycle does not require use of the catalytic converter 64 for emission control. Thus the rerouting of by-passed gas around the catalytic converter 64 will increase the life of the converter by removing it from full time exposure to the hot, corrosive gases. The small amount of residual gas still flowing through turbine housing 10 when main flow is through exhaust gas outlet 14' will provide heat to the catalyst bed of catalytic converter 64 so as to maintain fast functioning when required. The full flow by-passing capability and rerouting of the by-passed gases will also provide lower back pressure on the engine due to removal of the restrictions to flow in the exhaust system.

What is claimed is:

1. A turbocharger including a housing having an exhaust inlet and an exhaust gas outlet in the turbine section thereof, the improvement comprising, a by-pass system for diverting exhaust gases around the turbine section, said by-pass system including a by-pass port and passage and a valve within said housing for selectively closing said by-pass port against exhaust gas flow therethrough into said by-pass passage, said valve being in the form of a pivotally mounted valve plate, said by-pass port opening through a face of said housing, and means mounting said valve plate for sliding movement parallel to said housing face and perpendicular to by-pass exhaust gas flow, whereby said valve plate position between fully opened and fully closed is infinitely variable, said means mounting said valve including a valve stem extending through an orifice in said housing to an external control, and said valve has a plate portion sealable against the interior of said turbine housing surrounding said orifice for closing said orifice in the closed position of said valve.

2. A turbocharger including a housing having an exhaust inlet and an exhaust gas outlet in the turbine section thereof, the improvement comprising, a by-pass system for diverting exhaust gases around the turbine section, said by-pass system including a by-pass port and passage and a valve within said housing for selectively closing said by-pass port against exhaust gas flow therethrough into said by-pass passage, said valve being in the form of a pivotally mounted valve plate, said by-pass port opening through a face of said housing, and means mounting said valve plate for sliding movement parallel to said housing face and perpendicular to by-pass exhaust gas flow, whereby said valve plate position between fully opened and fully closed is infinitely variable, said valve plate being positively spaced from said housing face, there being an exhaust material build-up on said housing face surrounding said by-pass port, and there is a sliding repeatedly formed and shaped seal between said valve plate and said exhaust material build-up.

3. A turbocharger including a housing having an exhaust inlet and an exhaust gas outlet in the turbine section thereof, the improvement comprising, a by-pass system for diverting exhaust gases around the turbine section, said by-pass system including a by-pass port and passage and a valve within said housing for selectively closing said by-pass port against exhaust gas flow therethrough into said by-pass passage, said valve being in the form of a pivotally mounted valve plate, said by-pass port opening through a face of said housing, and means mounting said valve plate for sliding movement parallel to said housing face and perpendicular to by-pass exhaust gas flow, whereby said valve plate position between fully opened and fully closed is infinitely variable, said valve plate being positively spaced from said housing face.

4. A turbocharger including a housing having an exhaust inlet and an exhaust gas outlet in the turbine section thereof, the improvement comprising, a by-pass system for diverting exhaust gases around the turbine section, said by-pass system including a by-pass port and passage and a valve within said housing for selectively closing said by-pass port against exhaust gas flow therethrough into said by-pass passage, said valve being in the form of a pivotally mounted valve plate, said by-pass port opening through a face of said housing, and means mounting said valve plate for sliding movement parallel to said housing face and perpendicular to by-pass exhaust gas flow, whereby said valve plate position between fully opened and fully closed is infinitely variable, said by-pass port and said valve plate each being of a generally quarter moon shape to minimize the angular movement of said valve plate required to fully uncover said by-pass port.

5. A turbocharger including a housing having an exhaust inlet and an exhaust gas outlet in the turbine section thereof, the improvement comprising, a by-pass system for diverting exhaust gases around the turbine section, said by-pass system including a by-pass port and passage and a valve within said housing for selectively closing said by-pass port against exhaust gas flow therethrough into said by-pass passage, said valve being in the form of a pivotally mounted valve plate, said by-pass port opening through a face of said housing, and means mounting said valve plate for sliding movement parallel to said housing face and perpendicular to by-pass exhaust gas flow, whereby said valve plate position between fully opened and fully closed is infinitely variable, the cross-sectional area of said by-pass passage being less than the cross-sectional area of said exhaust gas inlet, said by-pass port and said valve plate each being of a generally quarter moon shape to minimize the angular movement of said valve plate required to fully uncover said by-pass port.

6. A turbocharger including a housing having an exhaust inlet and an exhaust gas outlet in the turbine section thereof, the improvement comprising, a by-pass system for diverting exhaust gases around the turbine section, said by-pass system including a by-pass port and passage and a valve within said housing for selectively closing said by-pass port against exhaust gas flow therethrough into said by-pass passage, said valve being in the form of a pivotally mounted valve plate, said by-pass port opening through a face of said housing, and means mounting said valve plate for sliding movement parallel to said housing face and perpendicular to by-pass exhaust gas flow, whereby said valve plate position between fully opened and fully closed is infinitely variable, the cross-sectional area of said by-pass passage being less than the cross-sectional area of said exhaust gas inlet but of a sufficient area wherein exhaust gas by-passing does not create back pressure detrimental to performance of engines of a class of engines for which a particular turbocharger is intended, said by-pass port and said valve plate each are of a generally quarter moon shape to minimize the angular movement of said valve plate required to fully uncover said by-pass port.

* * * * *